US010882050B2

(12) United States Patent
Miyazaki et al.

(10) Patent No.: US 10,882,050 B2
(45) Date of Patent: Jan. 5, 2021

(54) ROTARY CLASSIFIER AND VERTICAL MILL

(71) Applicant: MITSUBISHI HITACHI POWER SYSTEMS, LTD., Kanagawa (JP)

(72) Inventors: Taku Miyazaki, Tokyo (JP); Takuichiro Daimaru, Tokyo (JP); Kenichi Arima, Tokyo (JP); Shinji Matsumoto, Tokyo (JP); Yuta Takahashi, Tokyo (JP); Kazushi Fukui, Kanagawa (JP); Takashi Iwata, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 392 days.

(21) Appl. No.: 15/622,314

(22) Filed: Jun. 14, 2017

(65) Prior Publication Data
US 2017/0274386 A1 Sep. 28, 2017

Related U.S. Application Data

(63) Continuation of application No. PCT/JP2015/073257, filed on Aug. 19, 2015.

(30) Foreign Application Priority Data

Dec. 16, 2014 (JP) .................................. 2014-254188

(51) Int. Cl.
B02C 15/00 (2006.01)
B07B 7/083 (2006.01)
(Continued)

(52) U.S. Cl.
CPC ............ B02C 15/007 (2013.01); B02C 15/04 (2013.01); B02C 23/12 (2013.01); B07B 7/083 (2013.01);
(Continued)

(58) Field of Classification Search
CPC .... B07B 7/083; B02C 2015/002; B01D 45/14
(Continued)

(56) References Cited

U.S. PATENT DOCUMENTS 5,927,510 A * 7/1999 Leute ...................... B07B 7/083
209/139.2
5,944,270 A * 8/1999 Farris ...................... B02C 15/00
241/119

(Continued)

FOREIGN PATENT DOCUMENTS

JP 2-251279 10/1990
JP H02251279 A * 10/1990

(Continued)

OTHER PUBLICATIONS

English translate (JPH07236861A (1)), retrieved date Oct. 22, 2019.*

(Continued)

Primary Examiner — Adam J Eiseman
Assistant Examiner — Mohammed S. Alawadi
(74) Attorney, Agent, or Firm — Wenderoth, Lind & Ponack, L.L.P.

(57) ABSTRACT

The present invention improves the even distribution of a powder to a pulverized coal pipe. A rotary classifier including: a rotary shaft rotatably supported around a rotational axis extending in a vertical direction; a frame body supported by the rotary shaft and including an opening on the outer periphery of the frame body; a plurality of powder outlets provided along the rotation direction and opening on the upper section of the frame body; a plurality of blades extending in the vertical direction at the opening on the outer periphery of the frame body and provided along the rotation
(Continued)

direction; and an annular member that serves as a constricting section provided so as to narrow the interval from the blades to the rotary shaft.

3 Claims, 6 Drawing Sheets

(51) Int. Cl.
  *B02C 15/04* (2006.01)
  *B02C 23/12* (2006.01)
  *B01D 45/14* (2006.01)
(52) U.S. Cl.
  CPC ........ *B01D 45/14* (2013.01); *B02C 2015/002* (2013.01)
(58) Field of Classification Search
  USPC .......................................................... 241/80
  See application file for complete search history.

(56) References Cited

U.S. PATENT DOCUMENTS

| 6,607,079 | B2 | 8/2003 | Laux | |
| 8,899,163 | B2* | 12/2014 | Takeuchi | C10L 5/366 |
| | | | | 110/222 |
| 9,527,112 | B2* | 12/2016 | Brulefert | B07B 7/08 |
| 2004/0084556 | A1* | 5/2004 | Chen | B07B 7/083 |
| | | | | 241/79.1 |
| 2007/0241035 | A1* | 10/2007 | Kolacz | B01D 45/14 |
| | | | | 209/714 |
| 2009/0065403 | A1* | 3/2009 | Ito | B07B 7/083 |
| | | | | 209/139.2 |
| 2010/0276525 | A1 | 11/2010 | Matsumoto et al. | |
| 2012/0138718 | A1* | 6/2012 | Daimaru | B07B 7/08 |
| | | | | 241/79 |
| 2013/0200187 | A1* | 8/2013 | Wark | B07B 7/083 |
| | | | | 241/68 |
| 2016/0207070 | A1* | 7/2016 | Goosen | B07B 7/086 |

FOREIGN PATENT DOCUMENTS

| JP | H07236861 A * | 2/1994 |
| JP | 6-77863 | 11/1994 |
| JP | 7-236861 | 9/1995 |
| JP | 2617832 | 6/1997 |
| JP | 2009-195897 | 9/2009 |
| WO | 2007/097042 | 8/2007 |

OTHER PUBLICATIONS

English translate (JPH02251279A), retrieved date Feb. 19, 2020.*
International Search Report dated Nov. 2, 2015 in corresponding International (PCT) Application No. PCT/JP2015/073257.
Written Opinion dated Nov. 2, 2015 in corresponding International (PCT) Application No. PCT/JP2015/073257.

* cited by examiner

ROTARY CLASSIFIER AND VERTICAL MILL

TECHNICAL FIELD

The present invention relates to a rotary classifier that pulverizes a solid material such as a coal and biomass into powder and then classifies the powder, and a vertical mill applied in the rotary classifier.

BACKGROUND ART

In a combustion facility such as a thermal power plant, a solid fuel such as a coal and biomass is used as a fuel. When such coal or the like is utilized as the solid fuel, a pulverized coal is generated by pulverizing a raw coal by a vertical mill, and the obtained pulverized coal is used as a fuel.

The vertical mill is configured by a mill table disposed driving rotatably in a lower section of a housing, a plurality of mill rollers being disposed corotatably in an upper surface of the mill table and capable of applying a pulverizing load, and a rotary classifier disposed in an upper section of the housing. Accordingly, when the raw coal is fed onto the mill table from a coal feeding pipe, the raw coal is dispersed to the entire surface by centrifugal force to form a coal layer. The coal layer is pulverized by being pushed by each of the mill rollers. Then, after being dried by supply air, the pulverized coal is classified to a predetermined particle diameter or less by the rotary classifier and only the pulverized coal having an appropriate particle diameter is discharged to the outside.

Conventionally, for example, a roller mill structure disclosed in Patent Document 1 has an object of evenly distributing powder that has passed through a classifier to four powder outlets when the powder such as a pulverized coal that has been pulverized by a mill roller is pneumatically conveyed. This roller mill structure is configured so that a powder obtained by pulverizing a pulverized material input into a mill body (housing) is discharged to the outside from the powder outlets of a housing top portion divided into a plurality in a peripheral direction by pneumatic conveyance. The roller mill structure includes a mill table that rotates in the housing, a plurality of rollers that rolls on the mill table and pulverize the pulverized material, and the classifier disposed upstream of the powder outlets. A rectifier that partly narrows a flow path cross-sectional area is provided partway in a flow path of a powder flow flowing into the classifier and toward to the powder outlets.

For example, a vertical pulverizer disclosed in Patent Document 2 has an object of obtaining a product of a particle size distribution having sharp classification characteristics with few variations in the particle size distribution in the product after being classified. The vertical pulverizer includes a rotary separator including an orthogonal drive shaft rotatably supported in a center of a classification chamber, and a plurality of planer classification blades that integrally rotate around the drive shaft. In the vertical pulverizer, pulverization of a raw material is performed by a rotary table located in a lower section of the classification chamber and mill rollers pushed onto and driven rotate by the rotary table. The classification blades have an inclined angle where a diameter thereof increases from downward toward upward in a side view. An outer diameter side of the classification blades is formed to be receded with respect to the rotation direction as compared to the inner diameter side in a plan view. Sweptback angles of the classification blades are different between an upper half and a lower half.

CITATION LIST

Patent Document

Patent Document 1: Japanese Unexamined Patent Application Publication No. 2009-195897A Patent Document 2: Japanese Patent No. 2617832B

SUMMARY OF INVENTION

Technical Problems

In Patent Document 1 described above, the rectifier is a movable vane that operates to be able to adjust a flow path cross-sectional area. Even distribution of a powder to a plurality of pulverized coal pipes is improved by changing a degree of opening of the movable vane and adjusting an obstructed amount of circulating particles. However, only with the movable vane, the obstruction effect is limited and even distribution is insufficient. The movable vane is provided in an upper side of the inside of the classifier having a relatively large space. Thus, in a lower side of the inside of the classifier having a relatively small space, deviation is generated in a flow rate of the powder and sufficient effect of even distribution is hard to be obtained.

In Patent Document 2 described above, since the sweptback angles of the classification blades are different between the upper half and the lower half, the classification blades need to be divided into an upper half and a lower half. For example, dividing about 60 classification blades in a peripheral direction of the classifier in such a way decreases assemblability. Moreover, assembling error becomes easy to occur and precision of the sweptback angle of each of the classification blades becomes poor, and therefore even distribution of the powder to the pulverized coal pipes becomes deteriorated.

The present invention solves the problem described above and has an object of providing a rotary classifier and a vertical mill capable of improving even distribution of a powder.

Solution to Problem

In order to achieve the object described above, a rotary classifier of one embodiment includes: a rotary shaft rotatably supported around a rotational axis extending in a vertical direction; a frame body supported by the rotary shaft and including an opening on the outer periphery of the frame body; a plurality of powder outlets provided along a rotation direction and opening on an upper section of the frame body; a plurality of blades extending in the vertical direction at the opening on the outer periphery of the frame body and provided along the rotation direction; and a constricting section provided so as to narrow the interval from the blades to the rotary shaft.

According to this rotary classifier, when an ascending flow, ascending in the inside of a frame body by a circulating flow due to blades rotating and moving, passes through a portion constricted by the constricting section, a circulating flow rate is increased by conservation of angular momentum. Due to the increase of the circulating flow rate, flow rate deviation in the peripheral direction is reduced. As a result, even distribution of a powder sent out to the outside of the frame body in each of the powder outlets can be improved.

A rotary classifier of one embodiment, wherein the constriction section includes an annular member provided continuously in the rotation direction and extending from the blades side to the rotary shaft side so as to narrow an interval of the rotary shaft side from the blades to the rotary shaft.

According to this rotary classifier, when the ascending flow, ascending in the inside of the frame body by the circulating flow due to the blades rotating and moving, passes through a portion constricted by the annular member that serves as the constricting section, the circulating flow rate is increased by conservation of angular momentum. Due to the increase of the circulating flow rate, flow rate deviation in the peripheral direction is reduced. As a result, even distribution of a powder sent out to the outside of the frame body in each of the powder outlets can be improved.

A rotary classifier of one embodiment, wherein the annular member includes an inclined surface formed upward from the blades side to the rotary shaft side in a bottom portion.

According to this rotary classifier, due to the inclined surface of the annular member, the ascending flow ascending in the inside of the frame body by the circulating flow due to the blades rotating and moving is rectified. Therefore, drift in which flow rate distribution of the powder is deviated in an inside region of the frame body is further reduced. As a result, an effect of improving even distribution of the powder sent out to the outside of the frame body in each of the powder outlets can be prominently acquired.

In a rotary classifier of one embodiment, an angle of the annular member with respect to a horizontal surface of the inclined surface is set in a range from −50 deg to 50 deg.

According to this rotary classifier, by setting the angle with respect to the horizontal surface of the inclined surface in the range from −50 deg to 50 deg, an effect of rectifying the ascending flow can be acquired preferably.

A rotary classifier of one embodiment includes a bottom part provided upward from an outer peripheral side of an inner bottom of the frame body toward the rotary shaft side, and including an inclined surface continuous in the rotation direction.

According to this rotary classifier, due to the inclined surface of the bottom portion, the ascending flow ascending in the inside of the frame body by the circulating flow due to the blades rotating and moving is rectified. Therefore, drift in which flow rate distribution of the powder is deviated in an inside region of the frame body is further reduced. As a result, by synergy with the effect of the annular member, an effect of improving even distribution of the powder sent out to the outside of the frame body in each of the powder outlets can be more prominently acquired.

In a rotary classifier of one embodiment, the angle of the bottom part with respect to the horizontal surface of the inclined surface is set in a range from 20 deg to 60 deg.

According to this rotary classifier, by setting the angle with respect to the horizontal surface of the inclined surface in the range from 20 deg to 60 deg, an effect of rectifying the ascending flow can be acquired preferably.

In a rotary classifier of one embodiment, the constriction section includes a convex part provided continuously in the rotation direction and protruding from a rotary shaft side to a blades side so as to narrow an interval of the blades side from the blades to the rotary shaft.

According to this rotary classifier, when the ascending flow, ascending in the inside of the frame body by the circulating flow due to the blades rotating and moving, passes through the portion constricted by the convex part that serves as the constricting section, the circulating flow rate is increased by conservation of angular momentum. Due to the increase of the circulating flow rate, flow rate deviation in the peripheral direction is reduced. As a result, even distribution of a powder sent out to the outside of the frame body in each of the powder outlets can be improved.

A vertical mill of one embodiment includes a hollow-shape housing, a mill table provided in a lower section in the housing and is rotated around a rotational axis along a perpendicular direction, a mill roller disposed opposite to an outer peripheral surface in an upper surface of the mill table and rotatably supported, and any one of the rotary classifiers described above provided in an upper section in the housing.

According to this vertical mill, by the rotary classifier including the constricting section, even distribution of the powder sent out to the outside of the frame body in each of the powder outlets can be improved. Therefore, when a solid material such as a coal (raw coal) or biomass is pulverized, pulverized coal can be supplied evenly to a combustion facility. Moreover, according to this vertical mill, deviation can be optionally applied to an amount of the pulverized coal of each of the powder outlets by the constricting section.

Advantageous Effects of Invention

In one embodiment, even distribution of a powder to a pulverized coal pipe can be improved.

DETAILED DESCRIPTION

Embodiments according to the present invention will be described below on the basis of the drawings. Note that the present invention is not limited by these embodiments. In addition, the constituent elements in the embodiments described below include those that can be easily replaced by a person skilled in the art or those that are substantially the same.

Figure 1:
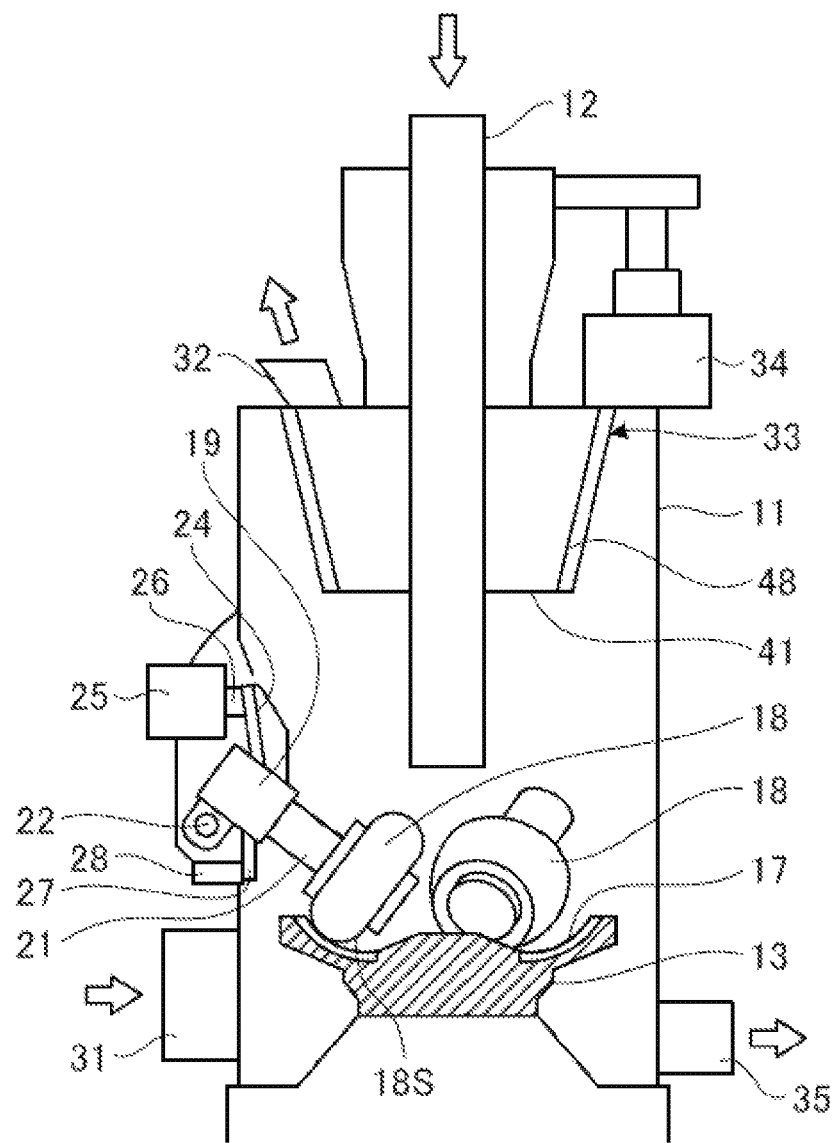
FIG. 1 is a schematic diagram of a vertical mill according to one embodiment of the present invention.

FIG. 1 is a schematic diagram of a vertical mill according to one embodiment of the present invention. The vertical mill of the present embodiment pulverizes a solid material such as a coal (raw coal) and biomass and supplies the pulverized coal as a fuel in a combustion facility such a thermal power plant, for example. Here, biomass refers to an organic resource derived from a renewable organism, for example, a thinned wood, a waste wood, a drift wood, grasses, waste, sludge, a tire, and a recycle fuel (such as a pellet and a chip) that uses these as raw materials and is not limited to these.

In the vertical mill of the present one embodiment, as illustrated in FIG. 1, a housing 11 has a cylindrical hollow shape. A coal supply pipe 12 is mounted on an upper section of the housing 11. The coal supply pipe 12 supplies a coal to the inside of the housing 11 from a coal supply device (not illustrated), and is disposed along a vertical direction (perpendicular direction) in a center position of the cylinder of the housing 11. An upper end portion of the coal supply pipe 12 extends on the outside of the housing 11 and a lower end portion of the coal supply pipe 12 is provided extending to a lower section of the inside of the housing 11.

A mill table 13 is disposed in the lower section of the housing 11. The mill table 13 is disposed opposite to the lower end portion of the coal supply pipe 12 in a center position of the housing 11. A lower section of the mill table 13 is connected to a rotary shaft (not illustrated) having a rotational axis along the perpendicular direction. Rotation of the mill table 13 is driven via the rotary shaft.

A table liner 17 having a ring shape is fixed to the mill table 13 on an outer peripheral side of the mill table 13. This table liner 17 has a front surface (upper surface) that is an inclined surface becoming higher toward an outer edge side of the mill table 13. Above the mill table 13 (table liner 17), a plurality of mill rollers 18 are disposed opposite to the upper surface of the mill table 13 (table liner 17). The mill rollers 18 are mounted to a support shaft 21. A rear end portion of the support shaft 21 is supported by a roller drive device 19. The roller drive device 19 is supported by a side wall portion of the housing 11 via an attachment shaft 22. Thereby, a tip portion of the support shaft 21 can rock in the vertical direction. The tip portion of the support shaft 21 faces a rotational axis side of the mill table 13 and is disposed inclined downward. The mill roller 18 is mounted to the tip portion of the support shaft 21. A plurality of the mill rollers 18 is provided (for example, three) and is disposed with equal intervals along the rotation direction of the mill table 13. The number and arrangement of the mill rollers 18 may be appropriately set according to sizes and the like of the mill table 13, the mill rollers 18, and the like.

The roller drive device 19 (support shaft 21) is provided with an upper arm 24 that extends upward. A tip portion of the upper arm 24 is connected to a tip portion of a pushing rod 26 of a hydraulic cylinder 25 that serves as a pushing device fixed to the housing 11. The roller drive device 19 (support shaft 21) is provided with a lower arm 27 that extends downward. A tip portion of the lower arm 27 can contact a stopper 28 fixed to the housing 11. Accordingly, when the pushing rod 26 is advanced by the hydraulic cylinder 25, the pushing rod 26 pushes the upper arm 24. Then, the roller drive device 19 and the support shaft 21 rotate and move in a clockwise direction in FIG. 1 using the attachment shaft 22 as a fulcrum. At this time, by the lower arm 27 contacting the stopper 28, rotational position of the roller drive device 19 and the support shaft 21 are defined.

The mill rollers 18 pulverize a coal in between the mill rollers 18 and the mill table 13 (table liner 17). A predetermined gap needs to be secured in between front surfaces 18S (outer peripheral surfaces) of the mill rollers 18 and the front surface of the mill table 13 (table liner 17). Accordingly, the support shaft 21 is defined in a predetermined rotational position by the hydraulic cylinder 25. Thereby, a predetermined gap in which a coal can be introduced and pulverized is secured between the front surfaces of the mill rollers 18 and the front surface of the mill table 13. When the mill table 13 rotates, the coal supplied onto the mill table 13 is moved to an outer peripheral side by centrifugal force and enters between the mill rollers 18 and the mill table 13. Since the mill rollers 18 are pushed to the mill table 13 side, rotational force of the mill table 13 is transmitted via the coal to the mill rollers 18. The mill rollers 18 can thus rotate in conjunction with the rotation of the mill table 13.

The housing 11 is provided with an inlet port 31 positioned in a periphery of an outer edge of the mill table 13, that is, a lower side of the housing 11. Air is supplied to the inside of the housing 11 through the inlet port 31. The housing 11 is provided with an outlet port 32 positioned in a periphery of a side portion of the coal supply pipe 12 in an upper section of the housing 11. The outlet port 32 is a pulverized coal pipe. From the outlet port 32, the coal pulverized as described above (pulverized coal) is discharged together with the air supplied to the inside of the housing 11. The housing 11 is provided with a rotary separator 33 as a rotary classifier that classifies the pulverized coal, below the outlet port 32, that is, the inside of the housing 11. The rotary separator 33 is rotatably provided in an outer peripheral portion of the coal supply pipe 12 and is driven to rotate by a drive device 34. The housing 11 is provided with a foreign substance discharge pipe 35 in the lower section. The foreign substance discharge pipe 35 discharges a foreign substance (spillage) such as a stone and a metal piece mixed in the coal, fallen from an outer peripheral portion of the rotating mill table 13.

Figure 2:
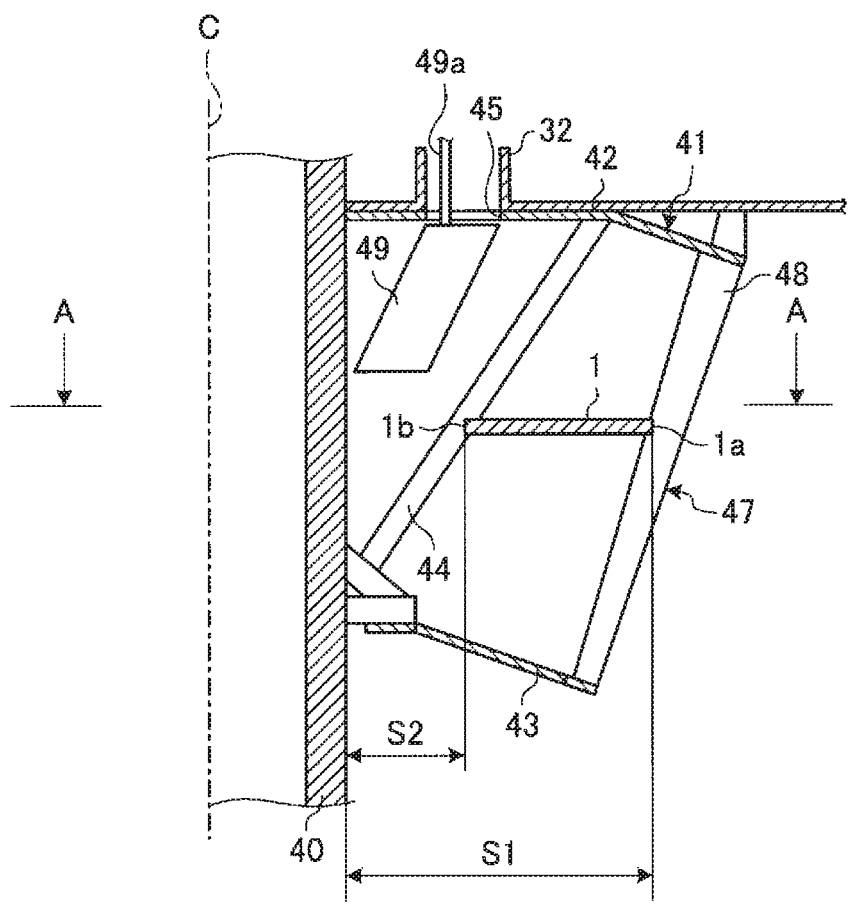
FIG. 2 is a side cross-sectional view of a rotary classifier according to one embodiment of the present invention.
Figure 3:
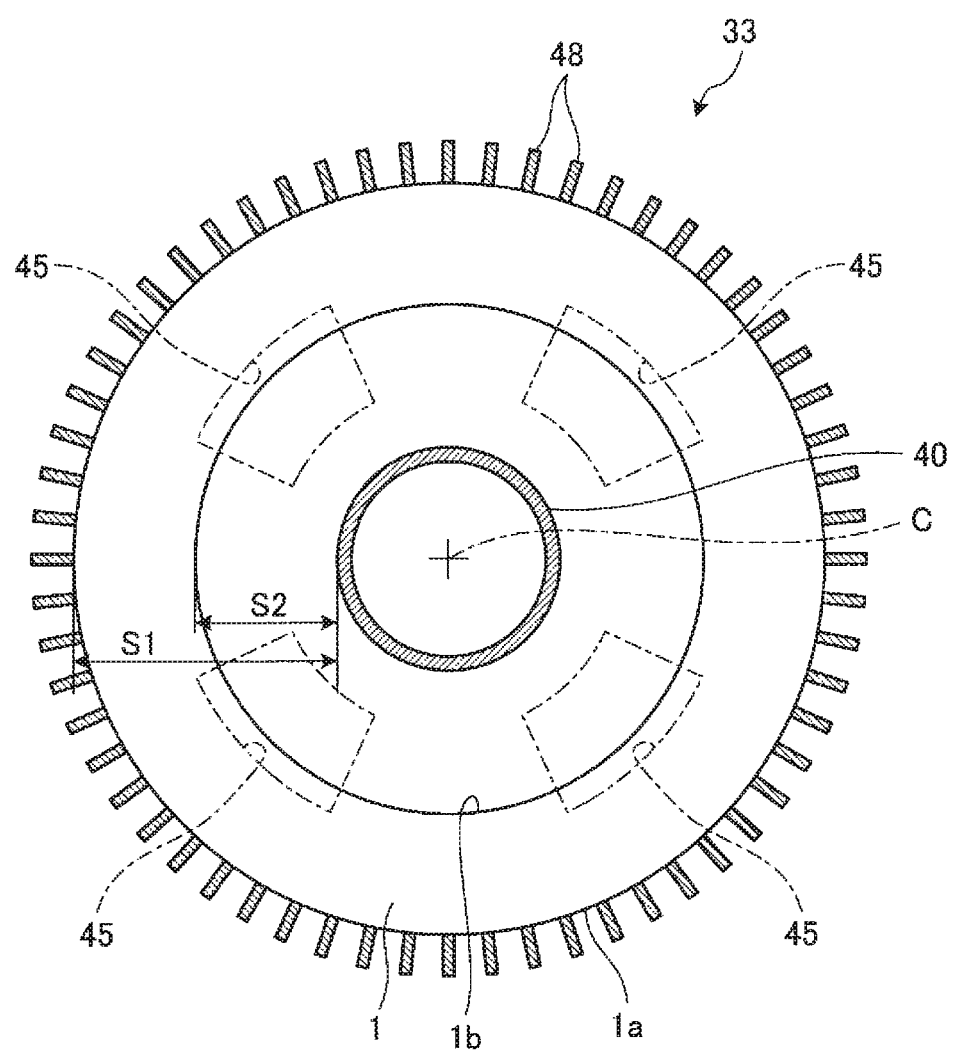
FIG. 3 is a cross-sectional view taken along A-A of FIG. 2.

The rotary separator 33 that serves as the rotary classifier of the present embodiment will be described in detail. FIG. 2 is a side cross-sectional view of the rotary classifier according to the one embodiment. FIG. 3 is a cross-sectional view taken along A-A of FIG. 2. In FIG. 2, since the configuration is symmetrical with a rotational axis C as a reference, a right half portion is illustrated and a left half portion is not illustrated.

As illustrated in FIG. 2 and FIG. 3, the rotary separator 33 includes a rotary shaft 40 that has a cylindrical shape. The rotary shaft 40 extends along the vertical direction (perpendicular direction) so as to surround the coal supply pipe 12 and is rotatably supported around the rotational axis C that is a center of the cylindrical shape and that extends in the vertical direction. The rotary shaft 40 is driven to rotate by the drive device 34 described above.

The rotary separator 33 has a frame body 41. The frame body 41 includes an upper support frame 42 and a lower support frame 43 that have circular shapes. Each center of the circular shapes of the upper support frame 42 and the lower support frame 43 is disposed on the rotational axis C of the rotary shaft 40, and the upper support frame 42 and the lower support frame 43 are supported by the rotary shaft 40. The upper support frame 42 and the lower support frame 43 are supported by each other by a flat bar shape support part 44 disposed extending in the vertical direction between the upper support frame 42 and the lower support frame 43. A plurality of the support part 44 is evenly disposed (for example, six) along the rotation direction of the rotational axis C (rotation direction of the rotary shaft 40). The frame body 41 is configured to block in the vertical direction by the upper support frame 42 and the lower support frame 43. As illustrated in FIG. 3, in the support frame 42, a plurality of arcuate shape powder outlets 45 are evenly disposed (for example, in four places) along the rotation direction centering around the rotational axis C. The powder outlets 45 communicate with the outlet port 32 that is a pulverized coal pipe. A movable vane 49 is disposed corresponding to a rear side of each of the powder outlets 45 in the rotation direction, that is, a lower side of the upper support frame 42. The movable vane 49 is driven to rotate by the drive device (not illustrated) via a shaft 49a extending in the vertical direction in a range of a predetermined angle. Thereby, the movable vane 49 obstructs the powder flow of the inside of the frame body 41 when the frame body 41 is rotating and guides the powder flow to each of the powder outlets 45. A movable vane disclosed in Patent Document 1 can be applied as the movable vane 49. The frame body 41 has an opening 47 opened in a portion that is an outer peripheral portion, between peripheral edges of the upper support frame 42 and the lower support frame 43.

With respect to the frame body 41, blades 48 are provided in the opening 47 between the upper support frame 42 and the lower support frame 43. The blades 48 extend in the vertical direction in the opening 47 in the outer peripheral portion of the frame body 41. A plurality of the blades 48 is provided (for example, sixty) along the rotation direction. The blades 48 are formed in a flat-plate shape and are provided inclined to the rotational axis C so that an upper end side of the blades 48 is separated from the rotary shaft 40 and a lower end side approaches the rotary shaft 40. In rotational movement around the rotational axis C in which the rotary shaft 40 is driven to rotate, when a particle of the pulverized coal intrudes between the plurality of blades 48, the blades 48 classifies the particle by allowing passage of a fine powder having a smaller particle size than a predetermined particle size between the blades 48, and preventing passage of a coarse powder having a larger particle size than a predetermined particle size between the blades 48 by blocking away the coarse powder to the outside by the blades 48.

As illustrated in FIG. 1, in the vertical mill of the present embodiment configured as above, when a coal is input to the coal supply pipe 12, the coal falls in the inside of the coal supply pipe 12 and is supplied to a center portion on the mill table 13, that is, the inside of the housing 11. At this time, since the mill table 13 is rotating at a predetermined speed, the coal supplied to the center portion on the mill table 13 moves to be dispersed outward by the effect of centrifugal force. Thus, a certain layer is formed in the entire surface of the mill table 13. That is, the coal enters between the mill rollers 18 and the mill table 13.

Then, the rotational force of the mill table 13 is transferred to the mill rollers 18 via the coal and the mill rollers 18 rotate together with the rotation of the mill table 13. At this time, the mill rollers 18 are pushed and supported to the mill table 13 side by the hydraulic cylinder 25. Thus, the mill rollers 18 push and pulverize the coal while rotating.

The coal pulverized by the mill rollers 18, that is, the pulverized coal, is dried and lifted by air supplied to the inside of the housing 11 from the inlet port 31. The lifted pulverized coal is classified by the rotary separator 33. The coarse powder falls and returns back onto the mill table 13 again, and re-pulverizing is performed. On the other hand, the fine powder passes through the rotary separator 33, rides onto the airflow, and is discharged from the outlet port 32. The spillage such as a stone and a metal piece mixed in the coal falls from the outer peripheral edge of the mill table 13 by centrifugal force and is discharged from the foreign substance discharge pipe 35.

That is, when the blades 48 rotate and move in the rotary separator 33, since a mass (weight) of the coarse powder in the pulverized coal is large, the coarse powder has a large inertia force and high linearity. Therefore, the coarse powder collides with the blades 48, thus becomes hard to pass through between the blades 48, and is blocked away to the outside of the frame body 41 to be excluded. On the other hand, since a mass (weight) of the fine powder in the pulverized coal is smaller than that of the coarse powder, the fine powder has a small inertia force and low linearity. Therefore, the fine powder is less likely to collide with the blades 48. Even when colliding, the fine powder is not blocked away to the outside of the frame body 41, passes through between the blades 48, and enters to the inside of the frame body 41. In this way, the blades 48 can exclude the coarse powder and introduce only the fine powder to the inside of the frame body 41.

The rotary separator 33 in the vertical mill of the present embodiment is provided with a constricting section in the configuration described above. As illustrated in FIG. 2 and FIG. 3, the constricting section is provided to narrow an interval from the blades 48 to the rotary shaft 40 and is configured as an annular member 1 provided continuously in the rotation direction and extending from the blades 48 side to the rotary shaft 40 side.

The annular member 1 is a ring-shape circular plate of which a center is opened and is disposed between the upper support frame 42 and the lower support frame 43. The outer edge 1a of the annular member 1 is supported by the blades 48 and the inner edge 1b is supported by the support part 44. The annular member 1 is disposed in the inside of the frame body 41 from the blades 48. Accordingly, the annular member 1 that serves as the constricting section is provided to narrow an interval S1 from the outer edge 1a, that is, the inner edge of the blades 48, to the rotary shaft 40 to an interval S2 from the inner edge 1b to the rotary shaft 40 by a width between the outer edge 1a and the inner edge 1b of the annular member 1, and constrict an interval between the upper support frame 42 and the lower support frame 43 in the inside of the frame body 41.

As described above, the fine powder in the pulverized coal is introduced to the inside of the frame body 41 by the blades 48. The fine powder introduced to the inside of the frame body 41 ascends in the inside of the frame body 41 while rotating along the periphery of the rotary shaft 40 due to a circulating flow generated by rotation and movement of the blades 48. In this way, the fine powder that ascends in the inside of the frame body 41 then reaches each of the powder outlets 45 and is discharged from the outlet port 32 through the powder outlets 45.

In the present embodiment, the annular member 1 that serves as the constricting section is provided. Therefore, when an ascending flow that ascends in the inside of the frame body 41 due to the circulating flow passes through, to be drawn to an inner side, between the inner edge 1b and the rotary shaft 40 constricted by the annular member 1, a circulating flow rate is increased by the conservation of angular momentum. Due to the increase of the circulating flow rate, flow rate deviation in the peripheral direction is reduced. As a result, the powder including the fine powder introduced to the inside of the frame body 41 by the blades 48 is sent evenly to each of the powder outlets 45 by the increased circulating flow.

Figure 4:
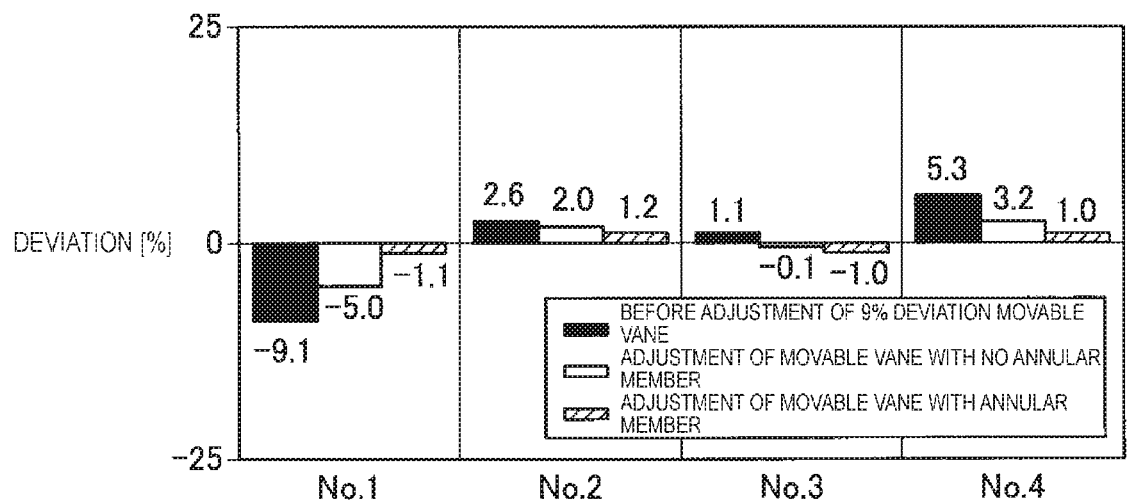
FIG. 4 is a graph showing flow rate deviation of the pulverized coal discharged from the powder outlets during classification.

The result of a classification test of a pulverized coal by the rotary separator 33 of the present embodiment will be described. FIG. 4 is a graph showing flow rate deviation of the pulverized coal discharged from the powder outlets at a time of classification.

In this classification test, in a state having deviation of 9%, a vertical mill was prepared in which a rotary separator provided with the annular member 1 that serves as the constricting section described above and a rotary separator not provided with the annular member 1 that serves as the constricting section described above, were applied. By measuring collection weight of fine powders discharged from outlet ports through each of four powder outlets in each of the rotary separators, flow deviation of the powder including fine powders was determined.

In FIG. 4, No. 1 to No. 4 correspond to four powder outlets disposed in the rotation direction of the rotary separator. In FIG. 4, black portions correspond to before adjustment by the movable vane 49 in deviation of 9%, white portions correspond to after adjustment by the movable vane 49 that is the rotary separator not provided with the annular member 1 that serves as the constricting section described above, and slanted line portions correspond to after adjustment by the movable vane 49 that is the rotary separator provided with the annular member 1 that serves as the constricting section described above. As shown in FIG. 4, by the rotary separator provided with the annular member 1 that serves as the constricting section described above, deviation could be reduced (adjusted) to 1.1%.

In this way, the rotary separator (rotary classifier) 33 of the present embodiment includes: the rotary shaft 40 rotatably supported around the rotational axis C extending in the vertical direction; the frame body 41 supported by the rotary shaft 40 including an opening 47 on the outer peripheral portion of the frame body 41; a plurality of powder outlets 45 provided opening on the upper section of the frame body 41; a plurality of blades 48 provided extending in the vertical direction at the opening 47 on the outer peripheral portion of the frame body 41 along the rotation direction; and the annular member 1 that serves as the constricting section provided so as to narrow the interval from the blades 48 to the rotary shaft 40.

According to this rotary separator 33, when an ascending flow ascending in the inside of the frame body 41 by a circulating flow due to the blades 48 rotating and moving passes through, to be drawn to the inner side, in a portion constricted by the annular member 1, a circulating flow rate is increased by conservation of angular momentum. Due to the increase of the circulating flow rate, flow rate deviation in the peripheral direction is reduced. As a result, even distribution of a powder sent out to the outside of the frame body 41 in each of the powder outlets 45 can be improved. Moreover, the present embodiment can improve the obstruction effect of the particle in the movable vane 49 by the annular member 1 with respect to the configuration in which the movable vane 49 is disposed corresponding to the rear side of each of the powder outlets 45, and by the obstruction effect of the movable vane 49, even distribution of the powder can be improved. Thus, even distribution of the pulverized coal amount can be further improved.

Figure 5:
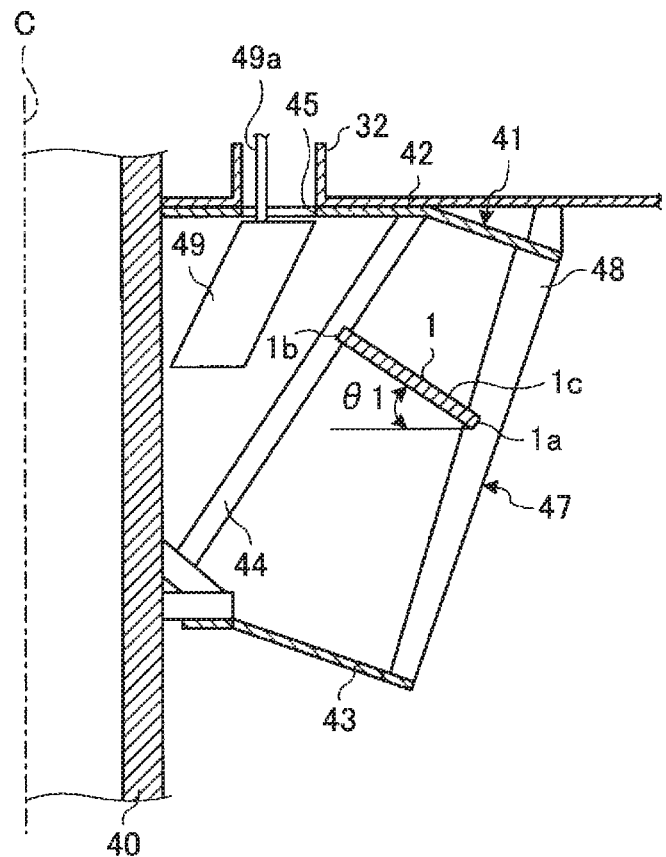
FIG. 5 is a side cross-sectional view of the rotary classifier according to another embodiment of the present invention.
Figure 6:
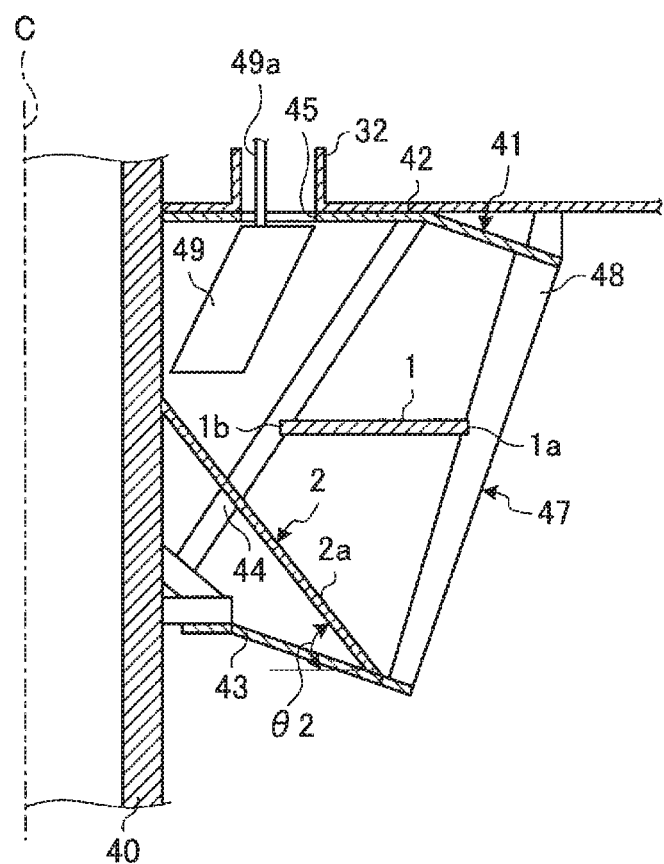
FIG. 6 is a side cross-sectional view of the rotary classifier according to another embodiment of the present invention.
Figure 7:
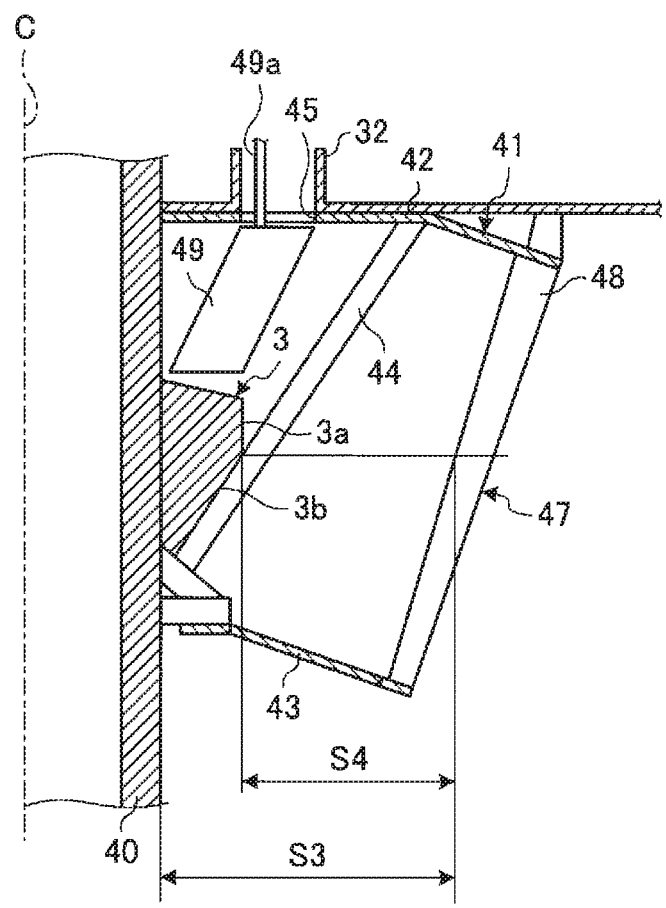
FIG. 7 is a side cross-sectional view of the rotary classifier according to another embodiment of the present invention.

FIGS. 5 to 7 are side cross-sectional views of the rotary classifier according to another embodiment. In FIGS. 5 to 7, since the configuration is symmetrical with a rotational axis C as a reference, a right half portion is illustrated and a left half portion is not illustrated.

As illustrated in FIG. 5, in the rotary separator 33 that serves as the rotary classifier of the present another embodiment, the annular member 1 that serves as the constricting section described above has, in the bottom portion, an inclined surface 1c formed upward from the blades 48 side to the rotary shaft 40 side. In FIG. 5, the inclined surface 1c is formed by the plate-shape annular member 1 being inclined upward from the blades 48 side to the rotary shaft 40 side. The inclined surface 1c is provided in a flat shape in a cross section in the entire region from the blades 48 side to the rotary shaft 40 side of the annular member 1.

Although not illustrated, the inclined surface 1c may not be provided in the entire region from the blades 48 side to the rotary shaft 40 side of the annular member 1. For example, the blades 48 side and the rotary shaft 40 side may be inclined partly. Although not illustrated, the inclined surface 1c is not limited to a flat shape and may be formed in a curved shape in a cross section that curves so that a tangent gradually faces upward from the blades 48 side to the rotary shaft 40 side and comes close to an orthogonal. Although not illustrated, the inclined surface 1c may be formed so that only a bottom portion of the annular member 1 is inclined.

According to this rotary separator 33, due to the inclined surface 1c of the annular member 1, an ascending flow ascending in the inside of the frame body 41 by a circulating flow due to the blades 48 rotating and moving is rectified. Therefore, drift in which flow rate distribution of the powder is deviated in an inside region of the frame body 41 is further reduced. As a result, an effect of improving even distribution of a powder sent out to the outside of the frame body 41 in each of the powder outlets 45 can be prominently acquired.

In order to acquire preferably the effect of rectifying the ascending flow, the angle θ1 of the inclined surface 1c with respect to the horizontal surface is preferably in a range from −50 deg to 50 deg.

As illustrated in FIG. 6, in the configuration in which the annular member 1 that serves as the constricting section described above is provided, the rotary separator 33 that serves as the rotary classifier of the present embodiment includes: a bottom part 2 provided upward from the outer peripheral side of the inner bottom of the frame body 41 to the rotary shaft 40 side and having an inclined surface 2a continuous in the rotation direction. In FIG. 6, the inclined surface 2a is provided in a flat shape in a cross section in the entire region from a lower end side of the blades 48 to the rotary shaft 40.

Although not illustrated, the inclined surface 2a may not be provided in the entire region from the lower end side of the blades 48 to the rotary shaft 40. For example, the lower end side of the blades 48 and the rotary shaft 40 side may be inclined partly. Although not illustrated, the inclined surface 2a is not limited to a flat shape and may be formed in a curved shape in a cross section that curves so that a tangent gradually faces upward from the lower end side of the blades 48 to the rotary shaft 40 and comes close to an orthogonal.

According to this rotary separator 33, due to the inclined surface 2a of the bottom part 2, an ascending flow ascending in the inside of the frame body 41 by a circulating flow due to the blades 48 rotating and moving is rectified. Therefore, drift in which flow rate distribution of the powder is deviated in an inside region of the frame body 41 is further reduced. As a result, by synergy with the effect of the annular member 1, an effect of improving even distribution of the powder sent out to the outside of the frame body 41 in each of the powder outlets 45 can be more prominently acquired.

If the inclined surface 1c described above is provided in the annular member 1, by synergy with the effect of the annular member 1, an effect of improving even distribution of the powder sent out to the outside of the rotary separator 33 in each of the powder outlets 45 can be more prominently acquired.

In order to acquire the effect of rectifying the ascending flow preferably, the angle θ2 of the inclined surface 2a with respect to the horizontal surface is preferably in a range from 20 deg to 60 deg.

As illustrated in FIG. 7, in the rotary separator 33 that serves as the rotary classifier of the present embodiment, the constricting section includes a convex part 3 provided continuously in the rotation direction and protruding from the rotary shaft 40 side to the blades 48 side so as to narrow an interval of the blades 48 side from the blades 48 to the rotary shaft 40.

The convex part 3 is supported by the rotary shaft 40 and is disposed between the upper support frame 42 and the lower support frame 43. The protrusion of the convex part 3 from the rotary shaft 40 is terminated in a position in the inside of the frame body 41 from the blades 48. Accordingly, the convex part 3 that serves as the constricting section is provided to narrow an interval S3 from the inner edge of the blades 48 to the rotary shaft 40, to an interval S4 from the inner edge of the blades 48 to the terminal end 3a by a position of the terminal end 3a and constrict a space between the upper support frame 42 and the lower support frame 43 in the inside of the frame body 41. The interval S4 is a distance of the blades 48 from the inner edge with respect to the horizontal position having a position in which the convex part 3 protrudes most in the blades 48 side as a reference. As illustrated in FIG. 7, when a position in which the convex part 3 protrudes most in the blades 48 side is parallel to the rotational axis C, the horizontal position having the lowest side position as a reference is considered as a distance of the blades 48 from the inner edge.

According to this rotary separator 33, when the ascending flow, ascending in the inside of the frame body 41 by a circulating flow due to the blades 48 rotating and moving, passes through a portion constricted by the convex part 3, a circulating flow rate is increased by conservation of angular momentum. Due to the increase of the circulating flow rate, flow rate deviation in the peripheral direction is reduced. As a result, even distribution of a powder sent out to the outside of the frame body 41 in each of the powder outlets 45 can be improved. Moreover, the present embodiment can improve the obstruction effect of the particle in the movable vane 49 by the convex part 3 with respect to the configuration in which the movable vane 49 is disposed corresponding to the rear side of each of the powder outlets 45, and even distribution of the powder is improved by the obstruction effect of the movable vane 49. Thus, even distribution of the pulverized coal amount can be further improved.

The position of the terminal end 3a of the convex part 3 is preferable not to relate to all of openings below the powder outlets 45 from the perceptive of not blocking distribution of the powder flow when the powder is sent from the powder outlets 45 to the outlet port 32.

The convex part 3 has an inclined surface 3b formed upward from the rotary shaft 40 side to the blades 48 side, in a lower section of the convex part 3. In FIG. 7, the inclined surface 3b is provided in a flat shape in a cross section in the entire region from a lower end side of the rotary shaft 40 to the terminal end 3a in the inside of the frame body 41.

Although not illustrated, the inclined surface 3b may not be provided in the entire region from the lower end side of the rotary shaft 40 to the terminal end 3a in the inside of the frame body 41, and may be inclined partly. Although not illustrated, the inclined surface 3b is not limited to the flat shape and may be formed in a curved shape in a cross section that curves so that a tangent gradually faces upward from the lower end side of the rotary shaft 40 to the terminal end 3a in the inside of the frame body 41 and comes close to an orthogonal.

According to this rotary separator 33, due to the inclined surface 3b of the convex part 3, the ascending flow ascending in the inside of the frame body 41 by the circulating flow due to the blades 48 rotating and moving is rectified. Therefore, drift in which flow rate distribution of the powder is deviated in an inside region of the frame body 41 is further reduced. As a result, an effect of improving even distribution of the powder sent out to the outside of the frame body 41 in each of the powder outlets 45 can be prominently acquired.

In a configuration in which the movable vane 49 is provided corresponding to each of the powder outlets 45, the rotary separator 33 that serves as the rotary classifier of the present embodiment described above reduces drift in which flow rate distribution of the powder is deviated in an inside region of the frame body 41. Thereby, an effect of improving even distribution of a powder sent out to the outside of the frame body 41 in each of the powder outlets 45 can be more prominently acquired.

A vertical mill of the present embodiment includes: a hollow-shape housing 11, a mill table 13 provided in a lower section of the housing 11 and rotated around a rotational axis along a perpendicular direction, mill rollers 18 disposed opposite to front surfaces 18S (outer peripheral surfaces) in an upper surface of the mill table 13 and rotatably supported, and the rotary separator (rotary classifier) 33 described above provided in an upper section of the housing 11.

According to this vertical mill, by the rotary separator 33 including a constricting section, even distribution of a powder sent out to the outside of the frame body in each of the powder outlets 45 can be improved. Therefore, when a solid material such as a coal (raw coal) or biomass is pulverized, pulverized coal can be supplied evenly to a combustion facility. Moreover, according to this vertical mill, deviation can be optionally applied to an amount of the pulverized coal of each of the powder outlets by the constricting section.

REFERENCE SIGNS LIST

1 Annular member
1a Outer edge
1b Inner edge
1c Inclined surface
2 Bottom part
2a Inclined surface
3 Convex part
3a Terminal end
3b Inclined surface
11 Housing
13 Mill table
18 Mill roller
33 Rotary separator (rotary classifier)
40 Rotary shaft
41 Frame body
42 Upper support frame
43 Lower support frame
44 Support part
45 Powder outlet
47 Opening
48 Blade
49 Movable vane
49a Shaft
C Rotational axis

The invention claimed is:
1. A rotary classifier comprising:
a rotary shaft rotatably supported around a rotational axis extending in a vertical direction;
a frame body supported by the rotary shaft and including an opening on an outer periphery of the frame body, the frame body further including an upper support frame and a lower support frame, the upper support frame and the lower support frame being supported by at least one flat bar-shaped support part disposed so as to extend in the vertical direction between the upper support frame and the lower support frame;
a plurality of powder outlets provided along the rotation direction and opening on an upper section of the frame body;
a plurality of blades extending in the vertical direction at the opening between peripheral edges of the upper support frame and the lower support frame and provided along the rotation direction; and
a constricting section provided so as to narrow an interval from the blades to the rotary shaft,
the constricting section including an annular member provided continuously in the rotation direction and extending from a blades side to a rotary shaft side so as to narrow the interval from an outer edge of the annular member to the rotary shaft to an interval from an inner edge of the annular member to the rotary shaft, wherein the annular member is disposed in an inside of the frame body relative to the blades, the outer edge of the annular member is directly supported by the blades, and the inner edge is directly supported by the at least one support part, and the annular member includes an inclined surface that extends upward from the blades side to the rotary shaft side.

2. The rotary classifier according to claim 1, wherein an angle of the annular member with respect to a horizontal surface of the inclined surface is set in a range from −50 degrees to 50 degrees.

3. The rotary classifier according to claim 1, wherein the constriction section includes a convex part provided continuously in the rotation direction and protruding from the rotary shaft side to the blades side so as to narrow the interval from the outer edge to the rotary shaft.

* * * * *